Sept. 9, 1952  A. G. ENANDER  2,609,837
EXHAUST DAMPER
Filed March 24, 1947

Inventor
Arthur G. Enander
Andrew J. Vintercorn
atty.

Patented Sept. 9, 1952

2,609,837

UNITED STATES PATENT OFFICE 2,609,837

EXHAUST DAMPER

Arthur G. Enander, Rockford, Ill., assignor to Smith & Enander, a copartnership composed of Claud A. Smith and Arthur G. Enander Application March 24, 1947, Serial No. 736,743

5 Claims. (Cl. 138—46)

This invention relates to an exhaust damper designed for use on the tail pipe of a motorcycle, but adapted for use on any tail pipe for exhaust cut-off and damper purposes. In recent years, the material shortage made mufflers unobtainable and the present damper was devised as a temporary substitute for mufflers, but its performance has been so satisfactory that it is believed most users would not install a muffler in preference to the damper if they could get a muffler. In other words, the present damper takes the place of the muffler and a cut-out usually provided in connection therewith.

Motorcyclists are, as a rule, very particular about the character or quality of exhaust noise from their engines. When passing through residence and business districts, it is necessary to muffle the exhaust noise to a reasonable extent, and this requires a careful adjustment of a damper so that the exhaust noise is still pleasing to the ears of the operator while still muffled to a legal extent, and, on the other hand, when travelling out on the highways, where muffling of the exhaust noise is not required, it is usually preferred by most motorcyclists to dampen the exhaust to a certain extent where the purr of the engine is pleasing to the ears—not too loud and not too subdued. Furthermore, it is important that the damper be operable quickly and easily with a kick from one position to another. The damper of my invention meets all of these requirements, being kick operable and preferably constructed so as to be easily adjustable in advance to predetermine the size of opening left for exhaust gas flow in the closed position and likewise the size of the opening afforded for exhaust gas flow in the open position, separate screw adjustments being provided for the two limit positions of the damper slide.

The invention is illustrated in the accompanying drawing, in which

Figure 1:
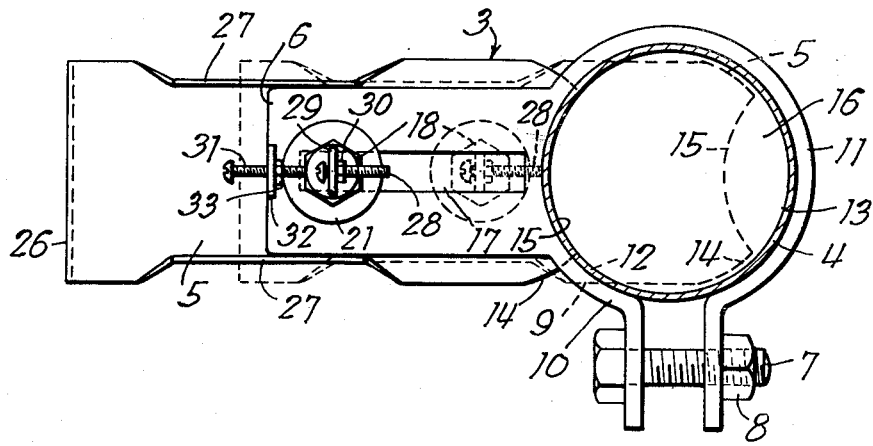
Figure 2:
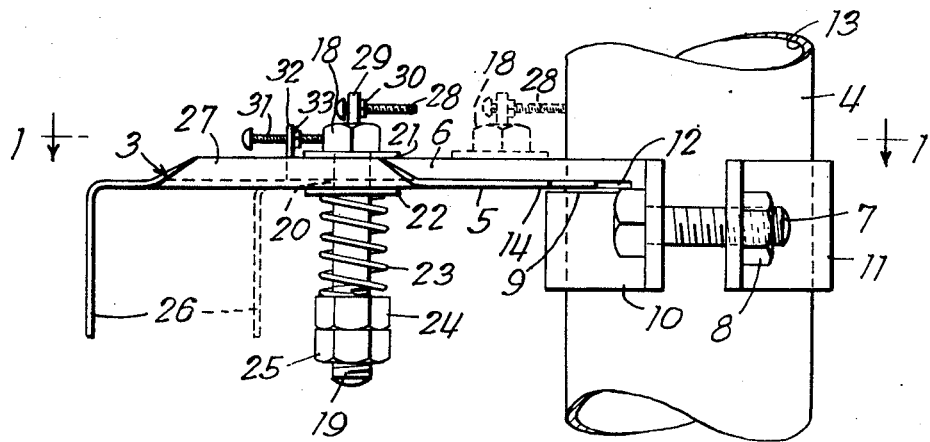

Fig. 1 is a face view of an exhaust damper made in accordance with my invention, this view being a section on line I—I of Fig. 2, and Fig. 2 is a side view of Fig. 1.

The same reference numerals are applied to corresponding parts in the two views.

Referring to the drawing, the reference numeral 3 designates the exhaust damper generally and 4 the exhaust tail pipe of a motorcycle engine or other internal combustion engine to which the damper 3 is applied to control the flow of exhaust gases therefrom. The damper 3 has been applied as a more or less temporary substitute for the usual muffler on the tail pipe, and the cut-out device usually provided in conjunction with the muffler for bypassing the exhaust gases for substantially direct discharge to the atmosphere when muffling of the exhaust noise is not necessary or compulsory. However, these dampers 3 have given such satisfactory results and besides are so inexpensive as compared with the cost of a muffler and cut-out that it is believed most motorcyclists who have used these dampers would not go back to the use of mufflers if given the opportunity.

The damper device 3 comprises a sheet metal slide 5, guided for endwise reciprocatory movement on a bracket 6 that is clamped by means of a bolt 7 and nut 8 to the tail pipe 4, the bracket having a slot 9 in one side portion 10 of the integral C-clamp 11 provided on one end thereof registering with a slot 12 sawed in one side of the pipe 4 through which the slide 5 moves diametrically relative to the pipe 4 across the bore 13 thereof to and from a closed position indicated in dotted lines in Fig. 1. The inner end of the slide 5 is cut away on an arc, as indicated at 14, to match the curvature of the inside of the pipe 4 on the diametrically opposite side from the slot 12 and being further cut away on this end portion, as at 15, to conform to the curvature of the inside of the pipe 4 on the slotted side 12, whereby to define the oblong restricted opening 16 between the inner end of the slide and the adjacent wall of the pipe 4 in the closed position of the damper indicated in dotted lines in Fig. 1. This is for muffling of the exhaust noise sufficiently to meet legal requirements in most places. The damper is shown in full lines in Fig. 1 in fully opened position corresponding to open cut-out operation with the conventional muffler and cut-out combination.

The bracket 6 is of elongated generally rectangular form and has an elongated slot 17 provided therein extending lengthwise thereof and lengthwise relative to the damper slide 5 which is also of elongated generally rectangular form, as clearly appears in Fig. 1. A bolt 18 has its threaded shank 19 extending through the slot 17 and through a registering hole 20 in the slide 5 and has washers 21 and 22 carried on the shank for engagement on the front of bracket 6 alongside slot 17 and on the back of slide 5 around the hole 20, respectively, a coiled compression spring 23 being mounted on the protruding end portion of the shank 19 and compressed between washer 22 and a nut 24 which threads on the shank and is adjustable toward the washer 22 to obtain the desired frictional drag on the to and fro movement of slide 5 to hold it releasably in either open or closed position, or for that matter, in any intermediate position to which the operator may move it. The lock nut 25 jams against nut 24 to hold it securely in adjusted position to maintain the selected spring pressure. The outer end 26 of the slide 5 is bent at right angles to provide a convenient arm which the operator may engage with the toe or heel of his shoe to kick the damper one way or the other, while riding the motorcycle. Bent up parallel side flanges 27 on the slide have an easy sliding fit on opposed longitudinal edge portions of the bracket to guide the slide 5 properly relative to the bracket for straight line to and fro movement and prevent binding.

An adjusting screw 28 may be provided threaded in a projection 29 on the head of bolt 18 for engagement with the pipe 4 in the closed position of the damper, as indicated in dotted lines in Figs. 1 and 2, to limit the closing and accordingly vary the size of the restricted opening 16, as desired. A lock nut 30 when tightened against projection 29 locks the screw 28 in adjusted condition. In a similar way, another adjusting screw 31 threaded in a projection 32 on the outer end of bracket 6 is arranged to engage the head of bolt 18 in the open position of slide 5, as shown in full lines in Figs. 1 and 2 to limit the opening movement and accordingly leave the inner end of the slide 5 projecting to some extent into bore 13, if so desired, for some damper effect on the exhaust where the equivalent of noisy open cut-out operation is to be avoided. Here, too, a lock nut 33 when tightened against projection 32 locks the screw 31 in adjusted condition. Either screw may, of course, be adjusted independently of the other.

It is believed the foregoing description conveys a good understanding of the objects and advantages of my invention. The appended claims have been drawn to cover all legitimate modifications and adaptations.

I claim:

1. A slide valve structure for a pipe having a transverse slot formed in one side said valve structure comprising, a bracket having means for attaching the same to said pipe in a plane in transverse relation to the bore thereof and parallel to the slot, a damper slide slidably mounted on said bracket and movable endwise through said slot transversely relative to the bore and having the inner end thereof of substantially semi-circular form to fit the curvature of the side of said pipe diametrically opposite the slot, the semi-circularly formed inner end having an edge portion removed affording a restricted discharge opening in the closed position of said slide, spring-pressed means for frictionally holding the slide in adjusted position relative to the bracket, and an adjustable stop for positively limiting the opening movement of said slide so as to predetermine the extent of restriction of flow in the open position of said slide.

2. A slide valve structure for a pipe having a transverse slot formed in one side said valve structure comprising, a bracket having means for attaching the same to said pipe in a plane in transverse relation to the bore thereof and parallel to the slot, a damper slide slidably mounted on said bracket and movable endwise through said slot transversely relative to the bore and having the inner end thereof of substantially semi-circular form to fit the curvature of the side of said pipe diametrically opposite the slot, the semi-circularly formed inner end having an edge portion removed affording a restricted discharge opening in the closed position of said slide, spring-pressed means for frictionally holding the slide in adjusted position relative to the bracket, a screw adjustable relative to a projection on said slide for abutment with the pipe in the closed position of said slide to limit closing movement and accordingly predetermine the extent of restriction of flow in the closed position of said slide, and another screw adjustable relative to a projection on said bracket for abutment with a portion of said slide in the open position thereof to limit opening movement and accordingly predetermine the extent of restriction of flow in the open position of said slide.

3. A slide valve structure for a pipe having a transverse slot formed in one side, said valve structure comprising a bracket having means for attaching the same to said pipe in a plane in transverse relation to the bore thereof and parallel to the slot, a damper slide slidably mounted on said bracket and movable endwise through said slot transversely relative to the bore and having the inner end thereof of substantially semi-circular form to fit the curvature of the side of said pipe diametrically opposite the slot, the semi-circularly formed inner end having an edge portion removed affording a restricted discharge opening in the closed position of said slide, a screw adjustable relative to a projection on said slide for abutment with the pipe in the closed position of said slide to limit closing movement and accordingly predetermine the extent of restriction of flow in the closed position of said slide, and another screw adjustable relative to a projection on said bracket for abutment with a portion of said slide in the open position thereof to limit opening movement and accordingly predetermine the extent of restriction of flow in the open position of said slide.

4. A slide valve structure for a pipe having a transverse slot formed in one side, said valve structure comprising a bracket having means for attaching the same to said pipe in a plane in transverse relation to the bore thereof and parallel to the slot, a damper slide slidably mounted on said bracket and movable endwise through said slot transversely relative to the bore and having the inner end thereof of substantially semi-circular form to fit the curvature of the side of said pipe diametrically opposite the slot, the semi-circularly formed inner end having an edge portion removed affording a restricted discharge opening in the closed position of said slide, and a screw adjustable relative to a projection on said slide for abutment with the pipe in the closed position of said slide to limit closing movement and accordingly predetermine the extent of restriction of flow in the closed position of said slide.

5. A slide valve structure for a pipe having a transverse slot formed in one side, said valve structure comprising a bracket having means for attaching the same to said pipe in a plane in transverse relation to the bore thereof and parallel to the slot, a damper slide slidably mounted on said bracket and movable endwise through said slot transversely relative to the bore and having the inner end thereof of substantially semi-circular form to fit the curvature of the side of said pipe diametrically opposite the slot, the semi-circularly formed inner end having an edge portion removed affording a restricted discharge opening in the closed position of said slide, and a screw adjustable relative to a projection on said bracket for abutment with a portion of said slide in the open position thereof to limit opening movement and accordingly predetermine the extent of restriction of flow in the open position of said slide.

ARTHUR G. ENANDER.

REFERENCES CITED

The following references are of record in the file of this patent:

UNITED STATES PATENTS

| Number | Name | Date |
|---|---|---|
| 768,393 | McArthur | Aug. 23, 1904 |
| 810,542 | Kahlenberg | Jan. 23, 1906 |
| 895,697 | Snow | Aug. 11, 1908 |
| 1,211,237 | Rockwell | Jan. 2, 1917 |
| 1,615,147 | Taylor | Jan. 18, 1927 |
| 1,870,557 | Curd | Aug. 9, 1932 |
| 2,271,138 | Hamer | Jan. 27, 1942 |
| 2,444,101 | Johnston et al. | June 29, 1948 |
| 2,530,095 | Stevens | Nov. 15, 1950 |